US012602968B2

(12) United States Patent
Daley et al.

(10) Patent No.: US 12,602,968 B2
(45) Date of Patent: Apr. 14, 2026

(54) FREE GAME MULTIPLIER FOR VIDEO KENO GAME

(71) Applicant: Aristocrat Technologies, Inc., Las Vegas, NV (US)

(72) Inventors: John Daley, Las Vegas, NV (US); Christopher Brune, Carson City, NV (US); David Kaminkow, Las Vegas, NV (US); Daniel Mirjavadi, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 56 days.

(21) Appl. No.: 18/086,879

(22) Filed: Dec. 22, 2022

(65) Prior Publication Data

US 2023/0130615 A1 Apr. 27, 2023

Related U.S. Application Data

(63) Continuation of application No. 17/478,770, filed on Sep. 17, 2021, now abandoned.

(51) Int. Cl.
*G07F 17/32* (2006.01)

(52) U.S. Cl.
CPC ...... *G07F 17/3267* (2013.01); *G07F 17/3211* (2013.01)

(58) Field of Classification Search
CPC ......................... G07F 17/3267; G07F 17/3211
See application file for complete search history.

(56) References Cited

U.S. PATENT DOCUMENTS

2005/0037832 A1* 2/2005 Cannon ............... G07F 17/3262 463/19
2006/0178196 A1 8/2006 Thomas
2007/0173312 A1* 7/2007 Dodge ................ G07F 17/3262 463/18
2008/0020819 A1 1/2008 Sakuma
2008/0026831 A1* 1/2008 Wright ................ G07F 17/3281 463/26
2008/0090634 A1 4/2008 Baerlocher
2009/0270163 A1* 10/2009 Mitelman ............... G07F 17/32 463/20
2012/0220356 A1* 8/2012 Gilbertson .......... G07F 17/3209 463/43

(Continued)

OTHER PUBLICATIONS

Office Action dated Jun. 8, 2022 for U.S. Appl. No. 17/478,770 (pp. 1-12).

(Continued)

*Primary Examiner* — Jeffrey K Wong
(74) *Attorney, Agent, or Firm* — Armstrong Teasdale LLP

(57) ABSTRACT

A computer-based video keno game displays a keno game including a set of game pieces of a game board of the keno game, each respective game piece of the game board corresponding to a respective number. A user interface may receive a player input for the keno game, where the player input specifies a set of selected game pieces including a set of special game pieces. A game controller may select a set of numbers from a pool of numbers and determine an amount of matches between the set of selected numbers and the set of selected game pieces. If the last selected number matches a special game piece, a number of free games may be multiplied by a multiplier.

18 Claims, 15 Drawing Sheets

(56) References Cited

U.S. PATENT DOCUMENTS

| | | | | |
|---|---|---|---|---|
| 2015/0045111 | A1* | 2/2015 | Nelson | G07F 17/3244 463/25 |
| 2016/0110964 | A1* | 4/2016 | Brown | G07F 17/32 463/31 |
| 2020/0074791 | A1* | 3/2020 | Uberuaga | G07F 17/3267 |
| 2020/0134966 | A1 | 4/2020 | Fields | |
| 2023/0089842 | A1* | 3/2023 | Daley | G07F 17/3211 463/18 |
| 2024/0062624 | A1* | 2/2024 | Patton | G07F 17/3237 |

OTHER PUBLICATIONS

Office Action dated Sep. 22, 2022 for U.S. Appl. No. 17/478,770 (pp. 1-16).

* cited by examiner

800

| | SPOTS MARKED | | | | | | | | |
|---|---|---|---|---|---|---|---|---|---|
| HITS | 2 | 3 | 4 | 5 | 6 | 7 | 8 | 9 | 10 |
| 2 | 15 | 2 | 2 | - | - | - | - | - | - |
| 3 | - | 45 | 5 | 3 | 3 | 1 | - | - | - |
| 4 | - | - | 85 | 11 | 4 | 2 | 2 | 1 | - |
| 5 | - | - | - | 804 | 68 | 20 | 12 | 6 | 5 |
| 6 | - | - | - | - | 1500 | 390 | 98 | 44 | 23 |
| 7 | - | - | - | - | - | 7000 | 1550 | 300 | 135 |
| 8 | - | - | - | - | - | - | 10000 | 4800 | 1000 |
| 9 | - | - | - | - | - | - | - | 10000 | 4500 |
| 10 | - | - | - | - | - | - | - | - | 10000 |
| RTP | 90.2% | 90.2% | 90.2% | 90.3% | 90.8% | 90.8% | 90.7% | 90.3% | 90.3% |

*FIG. 8A*

802

| | SPOTS MARKED | | | | | | | | |
|---|---|---|---|---|---|---|---|---|---|
| HITS | 2 | 3 | 4 | 5 | 6 | 7 | 8 | 9 | 10 |
| 2 | - | 2 | 1 | - | - | - | - | - | - |
| 3 | - | 25 | 5 | 3 | 2 | 1 | - | - | - |
| 4 | - | - | 70 | 15 | 10 | 5 | 5 | 1 | 1 |
| 5 | - | - | - | 200 | 50 | 10 | 10 | 5 | 5 |
| 6 | - | - | - | - | 400 | 50 | 30 | 15 | 10 |
| 7 | - | - | - | - | - | 7000 | 200 | 90 | 30 |
| 8 | - | - | - | - | - | - | 1600 | 500 | 1000 |
| 9 | - | - | - | - | - | - | - | 1900 | 1000 |
| 10 | - | - | - | - | - | - | - | - | 5000 |
| RTP | 92.0% | 92.0% | 92.0% | 92.0% | 92.0% | 92.0% | 92.0% | 92.0% | 92.0% |

*FIG. 8B*

FREE GAME MULTIPLIER FOR VIDEO KENO GAME

CROSS REFERENCE TO RELATED APPLICATIONS

This application is a continuation of and claims priority to U.S. patent application Ser. No. 17/478,770, filed Sep. 17, 2021, which is incorporated by reference herein in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Described herein is a computer-based video keno game that awards bonus games and bonus game multipliers in a manner that allows close management of the RTP and volatility of the game, while also providing improved game functionality. A game system may be configured to display a keno game including a set of game pieces of a game board of the keno game, each respective game piece of the game board corresponding to a respective number. A user interface may receive a player input for the keno game, where the player input specifies a set of selected game pieces (e.g., selected numbers). A game controller may select a set of numbers from a pool of numbers and determine an amount of matches between the set of selected numbers and the set of selected game pieces. If the amount of matches satisfies a condition (e.g., a threshold amount of the selected numbers match a certain type of selected game pieces), the game controller determines an amount of preliminarily earned bonus games. If the last selected number of the set of selected numbers matches one of the game pieces of the set of selected game pieces, the amount of preliminarily earned bonus games may be multiplied by a multiplier value to determine an amount of earned bonus games, which are then awarded to the user.

BRIEF DESCRIPTION OF THE DRAWINGS

FIGS. 8A-8B illustrate example pay tables for video keno games.

DETAILED DESCRIPTION

Figure 1:
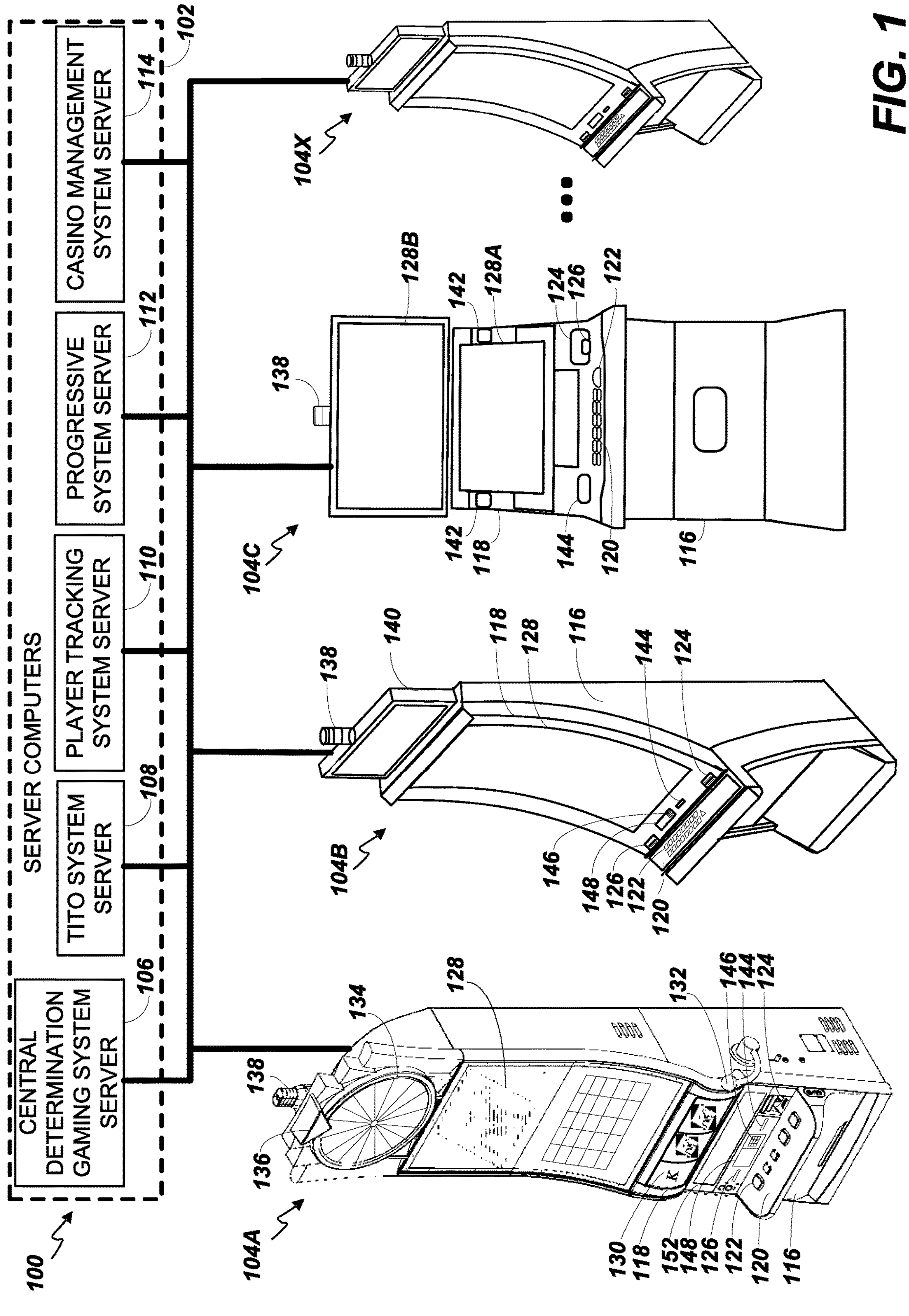
FIG. 1 is an exemplary diagram showing several EGMs networked with various gaming related servers.

Gaming devices, such as those described herein, may be used to implement a video keno game or other game. The game may include a base game having an associated base game play user interface and a bonus round having an associated bonus game play user interface. During a base game instance, users may select a set of primary game pieces, and the game controller may select a set of numbers (or other identifiers) from a pool of numbers (or other identifiers). Depending on the amount of matches between the selected game pieces and the selected set of numbers, a win amount may be determined. (As used herein, a match between a selected number and a game piece may be referred to as a "hit.") Additionally, when selecting the set of primary game pieces, users may also select a set of special game pieces which may be available to the user as a feature of the game. If a threshold number of the special game pieces match the selected set of numbers (e.g., if the player gets a threshold number of hits on the special game pieces), the user may be awarded with one or more bonus games to be played in a bonus round. The set of game pieces selected for the base game, which may include both primary game pieces and special game pieces, may be referred to as "base game pieces."

A bonus round may consist of a series of bonus game instances. During a bonus game instance, the game controller may identify a set of game pieces, which may be the same game pieces that were selected in the base game (e.g., the primary game pieces and the special game pieces used in the base game) or a different set of game pieces selected by the user for the bonus game, or some mixture of both. The game controller may select a set of supplemental outcome identifiers (e.g., numbers) from the pool of numbers, and a win amount may be determined based on the number of matches between the set of supplemental outcome identifiers and the game pieces selected for the bonus game. The set of game pieces selected for the bonus game, which may include both primary game pieces and special game pieces, may be referred to herein as "bonus game pieces."

As noted above, bonus games may be awarded if a threshold number of special game pieces match the selected set of numbers (e.g., if the user gets a threshold number of hits on the special game pieces). If the player is awarded bonus games, a bonus game multiplier may be applied to the number of awarded bonus games under certain conditions. In particular, if the last number drawn from the pool is a "hit" on one of the selected game pieces (either a primary game piece or a special game piece), the bonus game multiplier may be awarded to increase the number of bonus games awarded to the player. The value of the bonus game multiplier may be determined by the game controller, and may be selected (e.g., using a random number generator) from a set of predetermined multiplier values. In some cases, the same multiplier may be used to increase a game credit award if a credit award is earned and bonus games are not.

In a conventional keno game, the return to player (RTP) and volatility of the game may be essentially fixed. For example, a keno game may provide a pay table that establishes the payout for certain numbers of hits. Given a random selection of drawn numbers, the RTP is determined by the pay table. In a keno game as described with features that provide additional winning outcomes, as described herein, the RTP and volatility are determined at least in part by factors other than the pay table. For example, by providing features such as bonus games, supplemental outcome identifiers, credit multipliers, and bonus game multipliers, the RTP and volatility of the video keno game may depend on the odds of earning those features and the values to the player of those features. Accordingly, a pay table alone may not define the RTP and volatility of a game with such features, as there are additional game outcomes beyond the pay table that affect the value of winning outcomes and the frequency in which they are achieved.

Described herein are techniques for providing a new and improved gaming device operation and capability in a video keno game with features that provide additional winning outcomes (beyond a simple pay table), while also managing game characteristics such as RTP and/or volatility. In particular, the keno game described herein uses additional RNGs and weighted tables to facilitate the use of bonus games, supplemental outcome identifiers, credit multipliers, and bonus game multipliers, which can have a significant effect on the potential payout of a game, while managing RTP and/or volatility of the game.

FIG. 1 illustrates several different models of EGMs which may be networked to various gaming related servers. Shown is a system 100, also referred to as a gaming system, in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
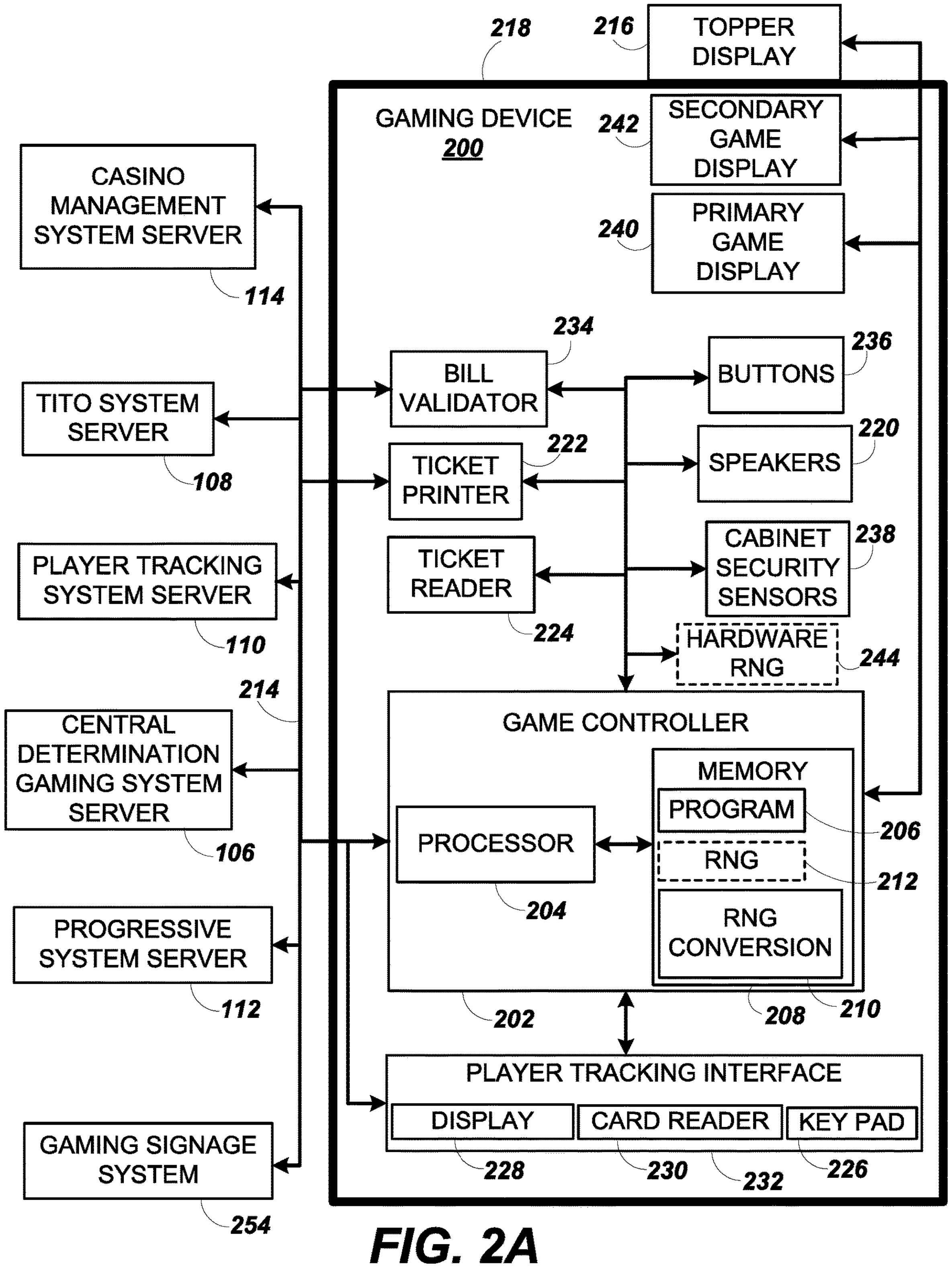
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display

240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
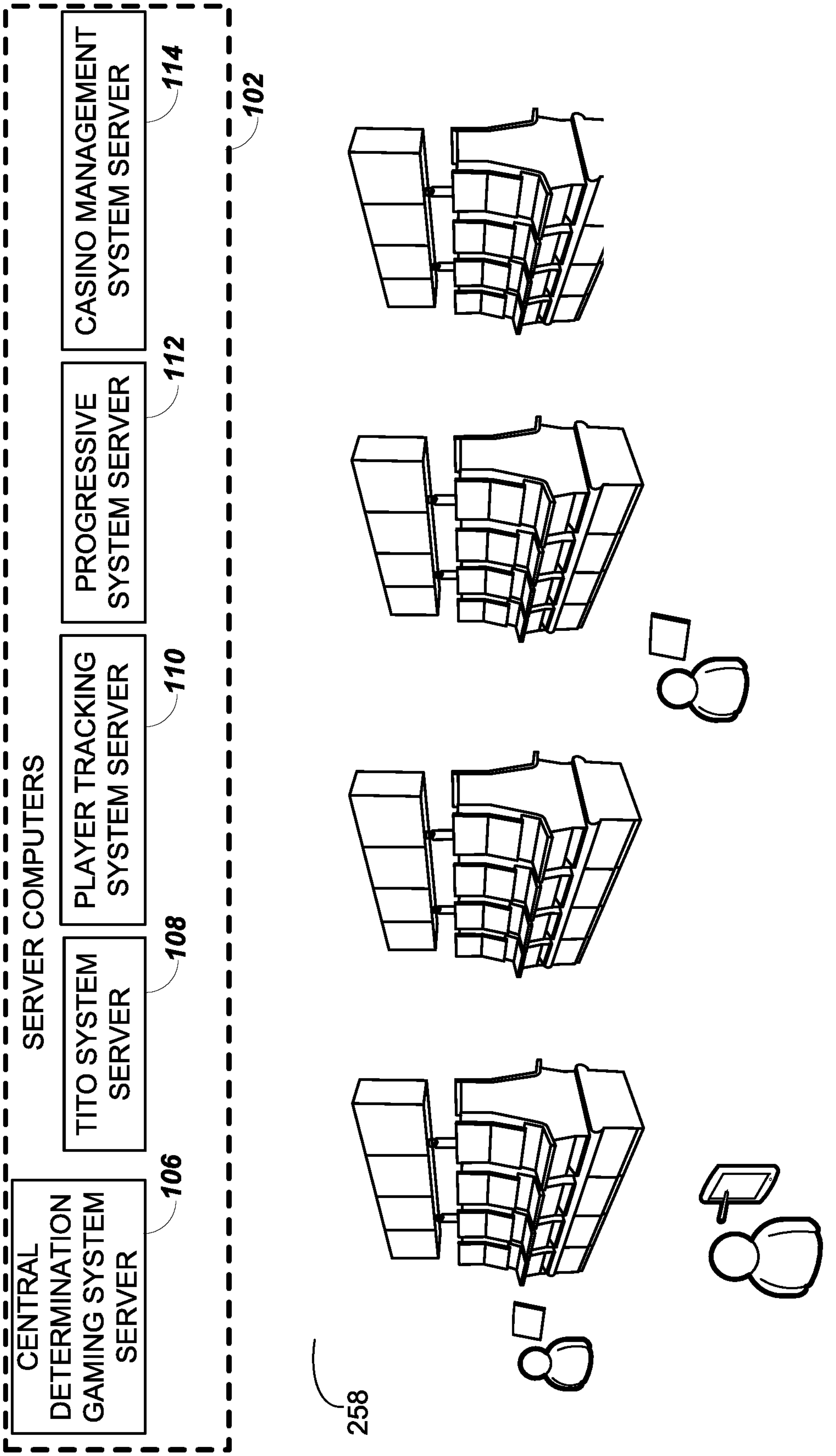
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
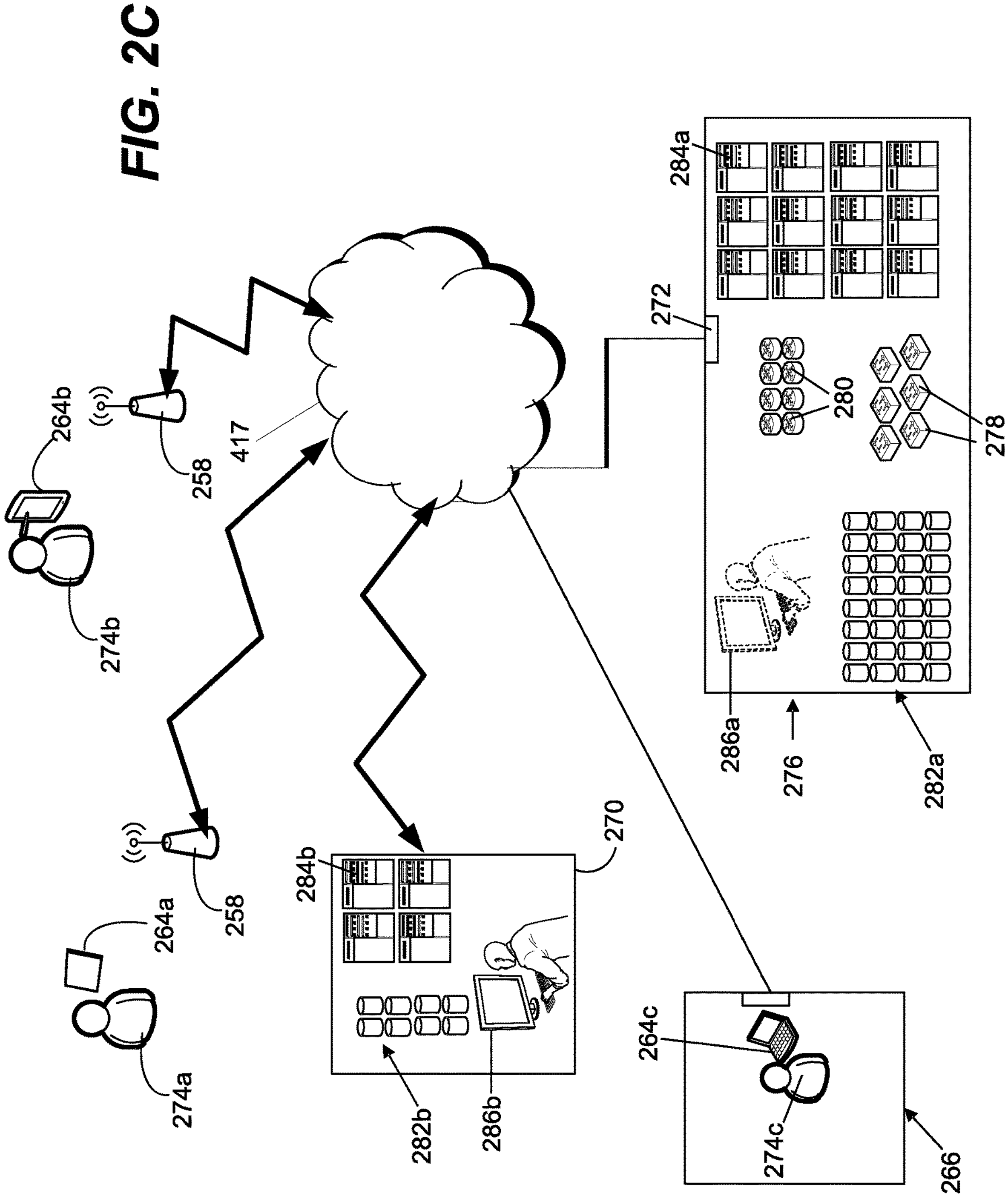
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
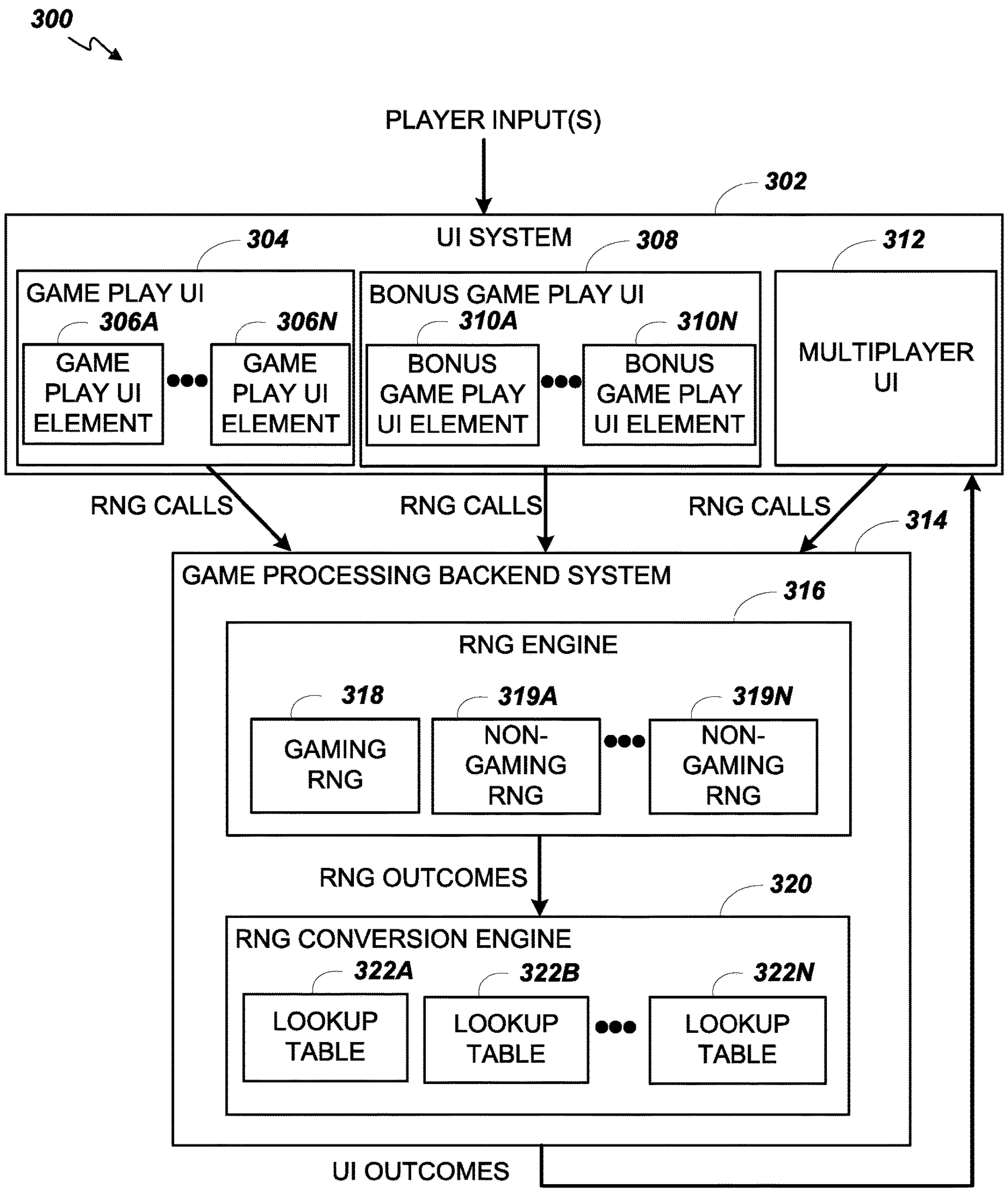
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N. Example game play UIs and bonus game UIs are shown and described below with respect to FIGS. 5A-7B.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

As noted above and described in more detail below, a keno game may include base game instances and bonus game instances. During a base game instance, users may select a set of game pieces (e.g., base game pieces). The selected set of game pieces may include primary game pieces and special game pieces. The amount of primary game pieces may be selected by a player, and the amount selected may affect the part of the pay table that is used to determine the win amounts. For example, if a player picks eight primary game pieces, the game selects a part of the pay table corresponding to eight primary game pieces; if the player picks two primary game pieces, the game selects a part of the pay table corresponding to two primary game pieces. Example pay tables are described herein with respect to FIGS. 8A-8B. Special game pieces may also be available. Special game pieces may be used to award players with bonus games. For example, a certain number of hits on the special game pieces may earn the player bonus games. Hits on the special game pieces may not be considered when determining a win amount from the pay table, however. Stated another way, only the hits on primary game pieces are used when determining a payout amount from a pay table, and only the hits on special game pieces are used when determining if bonus games are awarded. In some implementations, however, hits on the special game pieces are considered when determining a win amount from the pay table. Thus, for example, two hits on primary game pieces and two hits on special game pieces may correspond to four total hits for the purposes of determining a payout from a pay table.

Once the primary and special game pieces are selected, the game controller may select a set of numbers (or other identifiers) from a pool that includes the identifiers of the selectable game pieces (e.g., numbers). A win amount may be awarded based on the amount of matches (or hits) between the selected game pieces and the selected set of numbers, as determined by the appropriate pay table. Bonus games may be awarded based on the amount of matches (or hits) between the special game pieces and the selected set of numbers.

The number of bonus games awarded may be based on the amount of special game pieces that match the selected set of numbers. As one nonlimiting example, if three special game pieces match the selected set of numbers, four bonus games may be awarded; if four special game pieces match the selected set of numbers, nine bonus games may be awarded. Other values are also contemplated, and may be scaled by the number of special game pieces that are provided. Bonus game multipliers may be awarded under certain conditions as well, as described herein.

Once bonus games are earned, the keno game may execute bonus game instances. Bonus game instances are similar to base game instances. For example, the player selects primary game pieces and special game pieces, and can win credit awards (from a pay table) and/or additional bonus games based on the number of hits on the primary and special game pieces. In some cases, the amount of primary game pieces selectable by the player in the bonus game are limited to the same amount that were selected during the base game. For ease of reference, the game pieces selected during a base game instance may be referred to as base game pieces (and may include both primary and special game pieces), and the game pieces selected during a bonus game instance may be referred to as bonus game pieces (and may also include primary and special game pieces).

Figure 4:
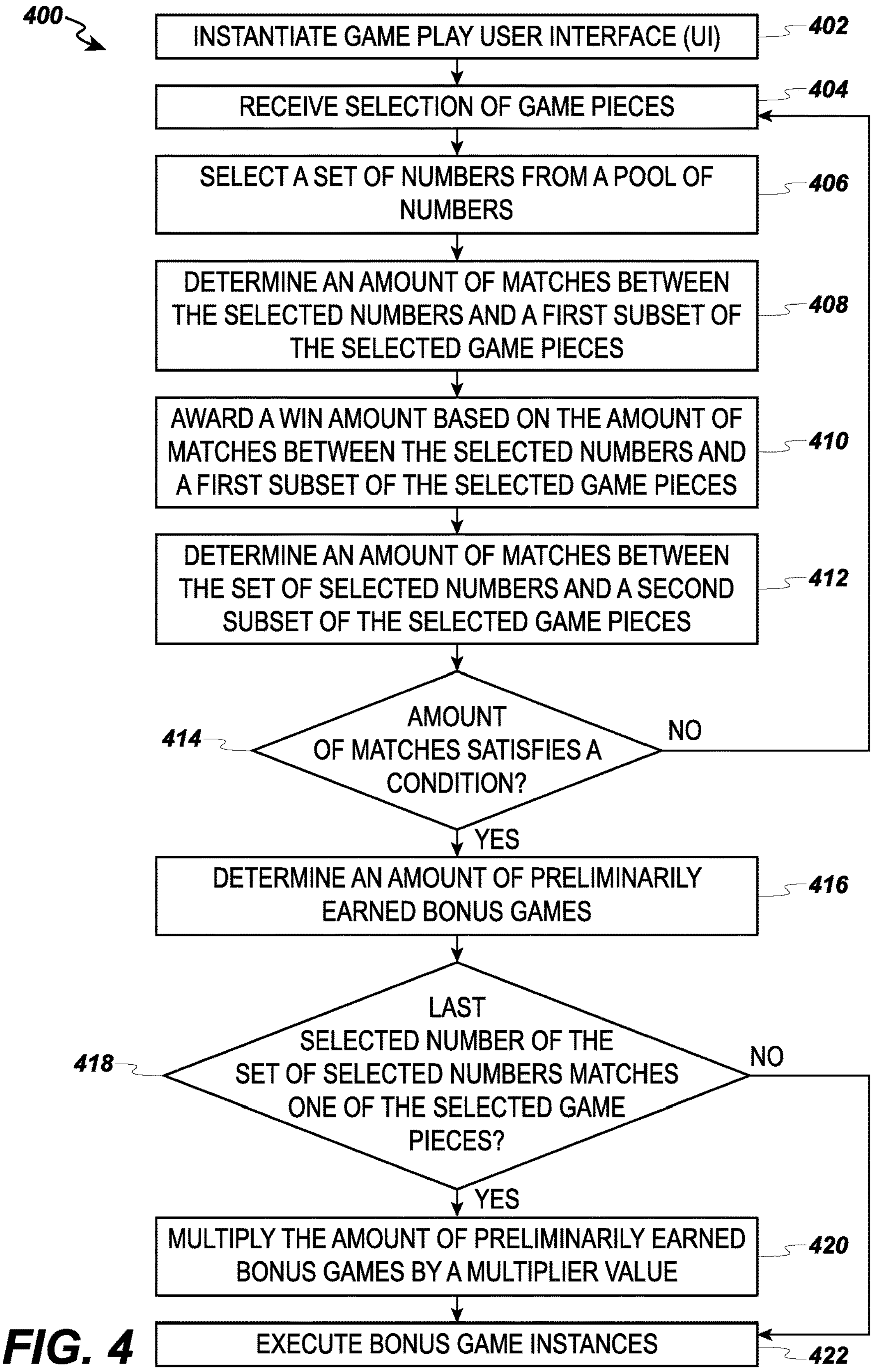
FIG. 4 is a flowchart depicting operations of an example method for implementing a bonus game multiplier for a video keno game or other game.

FIG. 4 is a flowchart depicting operations of an example method 400 for implementing a video keno game or other game as described above, including determining when a player has earned bonus games, as well as when to multiply the earned bonus games and by how much. The operations of the method 400 may be performed by a game controller (e.g., game controller 202) according to game processing architecture (e.g., game processing architecture 300). FIGS. 5A-7B illustrate an example game play UI 504 and/or bonus game play UI 505 for the video keno game or other game. The example game play UI 504 may be provided on a display of a gaming device (e.g., gaming devices 104A-104X and 200).

Figure 5A:
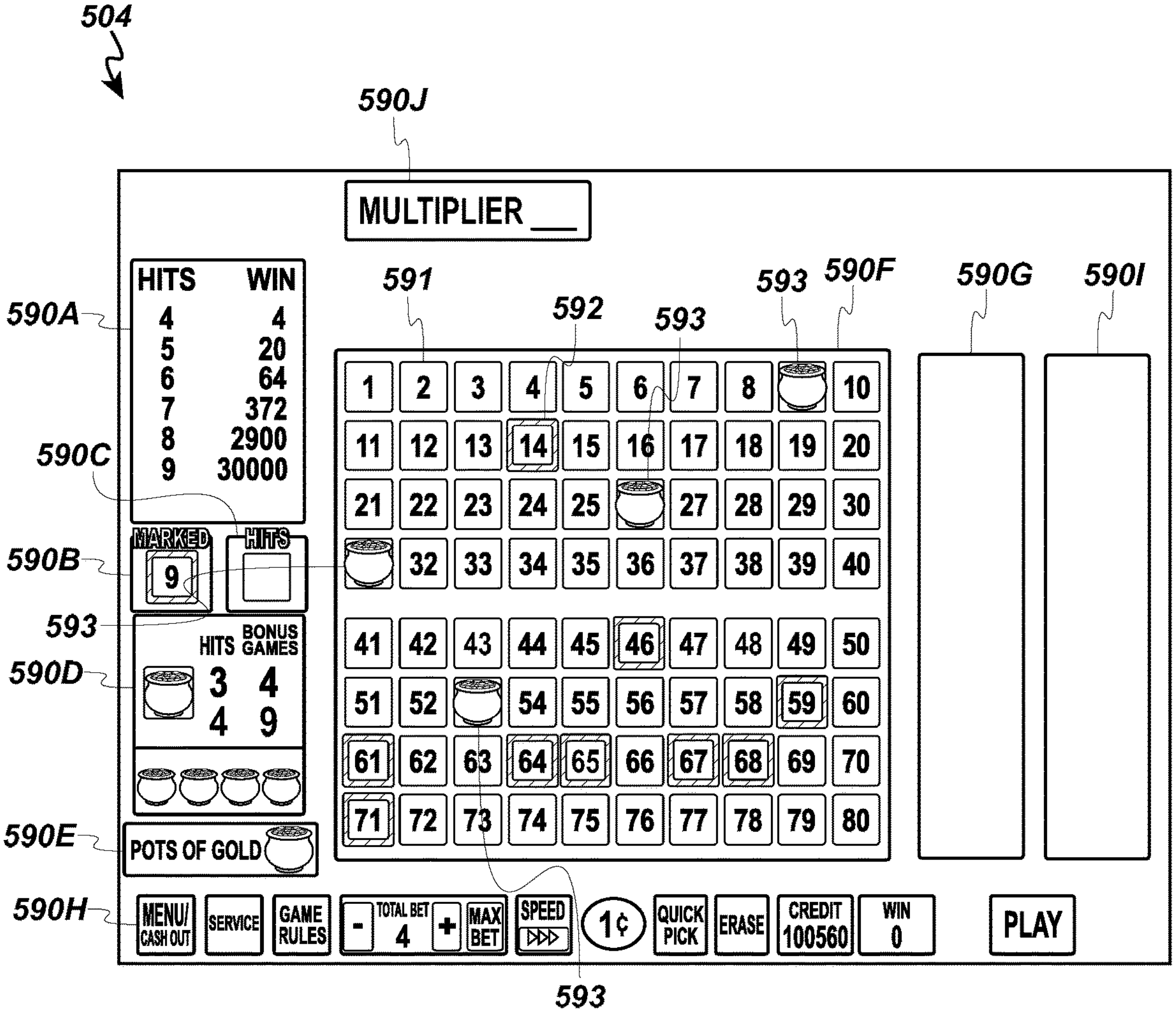
FIGS. 5A-7B illustrate example game play user interfaces for the base game and the bonus game of the video keno game or other game.

At operation 402, the game controller instantiates a game play UI (e.g., game play UI 504). One example of this UI is shown in FIG. 5A. In that example, the game play UI 504 includes UI regions 590A-J. The UI regions 590A-J include UI elements (e.g., game play UI elements 306A-306N) to present information to a user of the game and/or receive user inputs. The UI regions 590A-J are discussed in more detail below with respect to later figures.

The UI region 590F includes an array of selectable game pieces 591. Each game piece 591 depicts an identifier (e.g., a number, symbol, or the like) corresponding to the game piece. In the example shown in FIG. 5A, the identifiers are numbers from 1 to 80. In various embodiments, there may be any number of game pieces having any suitable identifiers.

At operation 404, the game controller receives a selection of one or more base game pieces, including primary game pieces and special game pieces. As shown in FIG. 5A, the selected primary game pieces 592 may be game pieces 591 that are selected by user input (e.g., by a user touching or otherwise selecting the game piece). In some cases, the primary game pieces 592 may be selected automatically, for example using the quick pick UI element in UI region 590H. The game play UI 504 may include a visual indication that a game piece is a selected primary game piece 592. For example, the selected primary game pieces 592 may include a different pattern, color, shading, or other features (e.g., a border or an icon) compared to other game pieces. As an example shown in FIG. 5A, the selected primary game pieces 592 may include a highlighted border. Additionally or alternatively, the selected primary game pieces 592 may have a different-colored number and/or other graphical differences. The UI region 590B may indicate a number of selected ("marked") primary game pieces 592. In this non-limiting example, nine selected primary game pieces 592 are indicated in UI region 590F and UI region 590B.

The special game pieces 593 may be game pieces 591 that are selected by user input. As an example, a user may touch or otherwise select the UI element in UI region 590E and then touch or otherwise select the special game pieces 593 in UI region 590F. In some cases, the special game pieces 593 may be selected automatically, for example using the quick pick UI element in UI region 590H. The game play UI 504 may include a visual indication that a game piece is a special game piece 593. For example, the special game pieces 593 may include a different pattern, color, shading, or other features (e.g., a border or an icon) compared to other game pieces. As an example shown in FIG. 5A, the special game pieces 593 may include an icon indicating they are selected as special game pieces. In the example shown, the icon is a pot of gold, though this is merely one example visual indication that may be used. The UI region 590D may provide information regarding the special game pieces 593. For example, the UI region 590D may indicate a number of selected special game pieces 593 and/or the threshold number of matching special game pieces required to enter the bonus round, and how many free games are awarded based on the number of matches between the special game pieces 593 and the selected set of numbers. In this non-limiting example, four special game pieces 593 have been selected as indicated in UI region 590F.

Returning to FIG. 4, at operation 406, the game controller selects a set of outcome identifiers (e.g., a set of numbers) from a pool of outcome identifiers (e.g., a pool of numbers). As noted above, the pool of outcome identifiers may consist of identifiers that match the identifiers of the selectable game pieces 591. In some cases, the pool of outcome identifiers may have equal numbers of each identifier such that selection of any particular identifier as an outcome identifier is equally likely as selection of any other identifier. In some cases, the selection of the outcome identifiers for main and/or bonus game instances may be weighted (e.g., using weighted tables). In some cases, only bonus game instances use weighted tables, while main game instances use non-weighted tables.

The set of selected outcome identifiers may be determined using a random number generator, as discussed in more detail above with respect to FIG. 3. In some cases, the game controller selects the set of outcome identifiers in response to a user selecting the 'PLAY' UI element of the UI region 590H. Selecting from a pool of outcome identifiers is one illustrative way of determining outcome identifiers, and other techniques are not beyond the scope of this disclosure.

Figure 5B:
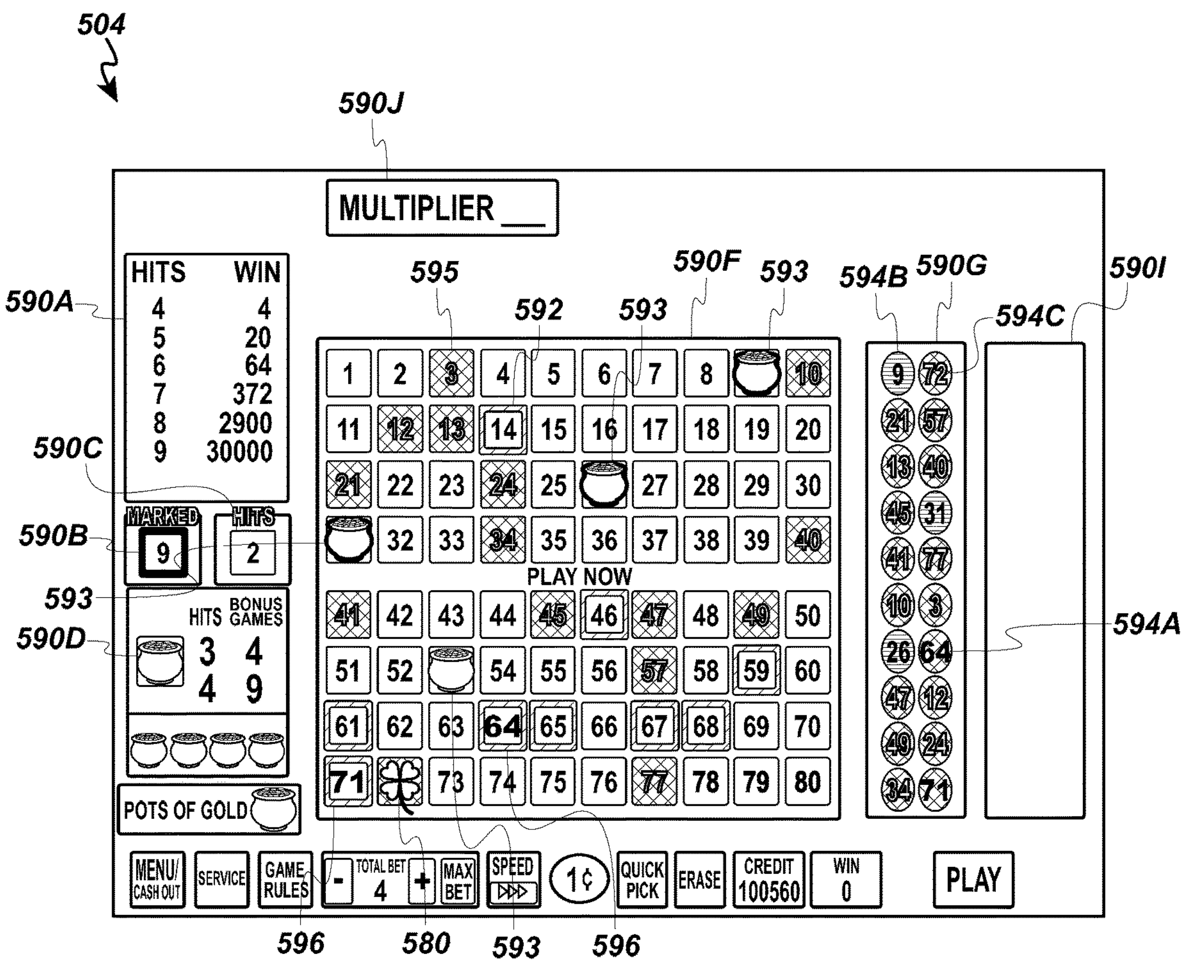

As shown in FIG. 5B, the game play UI 504 may present outcome identifiers 594 (e.g., 594A-C) corresponding to the set of outcome identifiers, for example in the UI regions 590G (for a set of main outcome identifiers) and 590I (for a set of supplemental outcome identifiers). Additionally or alternatively, the game play UI 504 may include one or more visual indications that a game piece of the array in UI region 590F corresponds to a selected identifier in the set of outcome identifiers. As an example shown in FIG. 5B, the game piece 595, which corresponds to a selected identifier in the set of outcome identifiers, may be a different color or pattern or otherwise visually distinguished from other game pieces in the array. In this non-limiting example, the game controller has selected and presented twenty outcome identifiers 594, as indicated in UI region 590F and UI region 590G, drawn from an exemplary pool of outcome identifiers of eighty outcome identifiers.

If a game piece is a selected primary game piece 592 and corresponds to a selected outcome identifier, it is a matching primary game piece 596. The base game play UI 504 may include one or more visual indications that a selected primary game piece 592 of the array in UI region 590F is a matching primary game piece 596. For example, the matching game pieces may include a different pattern, color, shading, or other features (e.g., a border or an icon) compared to other game pieces. As an example shown in FIG. 5B, the matching primary game piece 596 has a number with a different color and/or appearance. Other ways of visually distinguishing the matching primary game piece 596 are also contemplated (e.g., a distinctive border, background color, or pattern, etc.). The UI region 590C may indicate a number of matching game pieces ("HITS").

In various embodiments, the outcome identifiers 594 shown in the UI region 590G may also have visual indications of whether they correspond to matching game pieces (e.g., whether that outcome identifier is a "hit"). For example, outcome identifiers 594 that match selected primary game pieces (e.g., outcome identifier 594A) may include a different pattern, color, shading, or other features (e.g., a border or an icon) compared to other outcome identifiers 594. As an example, the outcome identifier 594A may have a different number, color, or appearance than other outcome identifiers. Similarly, outcome identifiers 594 that match selected special game pieces (e.g., outcome identifier 594B) may include a different pattern, color, shading, or other feature(s) (e.g., a border or an icon) compared to other outcome identifiers 594. As an example, the outcome identifier 594B may have a different number, color, or appearance than other outcome identifiers, and may have a different background, color, shading, or other visual indication further differentiating between hits on primary game pieces.

At operation 408, the game controller determines an amount of matches between the outcome identifiers (e.g., the set of selected numbers) and a first subset of the set of selected game pieces (e.g., the primary game pieces) to determine a win amount for the base game. In various embodiments, the win amount for the base game may be based on an amount of matching primary game pieces. The UI region 590A may include a pay table that specifies win amounts ("WIN") for particular amounts of matches ("HITS"). In this non-limiting example, only two matching primary game pieces 596 (numbers 64 and 71) are indicated in UI region 590F and only two hits are indicated in UI region 590C, which does not satisfy a condition needed to award a win amount to the user. While three of the special game pieces 593 match outcome identifiers (as indicated by the bold border around the special game pieces 593 that match outcome identifiers 594), matches between special game pieces 593 and outcome identifiers 594 do not count towards the win amount indicated in the pay table 590A. (In other cases, however, hits on the special game pieces 593 are counted towards the win amount indicated in the pay table 590A.)

At operation 410, the win amount (if any) is awarded based on the number of matches determined at operation 408. The win amount may correspond to an amount of credits, which may be monetary or non-monetary credits. Non-monetary credits may be redeemable for real money, or they may be "virtual gaming credits" that cannot be converted to or redeemed for real money. As noted above in the example of FIG. 5B, no win amount is to be awarded.

At operation 412, the game controller determines an amount of matches between the outcome identifiers (e.g., the set of selected numbers) and a second subset of the set of selected game pieces (e.g., the special game pieces) to determine whether bonus games are to be awarded to the user. As noted above, the number of hits of the special game pieces that are needed to trigger an award of one or more bonus games may be indicated in the UI region 590D.

If the amount of matches between the outcome identifiers (e.g., the set of selected numbers) and the second subset of the set of selected game pieces (e.g., the special game pieces) does not satisfy a condition (414, "NO"), then the gameplay may return to operation 404 (allowing the player to select a new set of base game pieces).

If the amount of matches between the outcome identifiers (e.g., the set of selected numbers) and the second subset of the set of selected game pieces (e.g., the special game pieces) satisfies a condition (414, "YES"), then the gameplay may proceed to operation 416, described below. In the non-limiting example of FIG. 5B, the UI region 590D indicates the conditions that must be satisfied in this example in order to earn bonus games. Because three of the special game pieces 593 match outcome identifiers 594 (as indicated by the bold border around the graphic of the special game pieces 593 that represent hits), the condition for earning bonus games (e.g., at least four free games) is satisfied.

At operation 416, the game controller determines an amount of bonus games that are preliminarily earned as a result of the condition at operation 414 being satisfied. The amount of bonus games that are preliminarily earned may be determined with reference to a win table (as shown in the UI region 590D) that associates an amount of hits with an amount of bonus games. In the non-limiting example of FIGS. 5B and 5C, the UI region 590D indicates that three hits earn four bonus games, and four hits earn nine bonus games, though other win tables are also contemplated. As described below, the amount of bonus games that are ultimately awarded to the user may be the same as the preliminarily earned bonus games (e.g., the preliminarily earned bonus games may become the earned bonus games), or they may be multiplied by a multiplier value; this multiplier value may be determined at a later point, in response to meeting certain criteria or conditions, in response to an amount of a wager, in response to a number of selected or special game pieces matched, and so on.

At operation 418, the game controller determines whether the last selected number of the set of selected numbers matches one of the selected game pieces (e.g., either one of the primary game pieces or one of the special game pieces). If the last selected number of the set of selected numbers does not match one of the selected game pieces (418, "NO"), then the preliminarily earned bonus games become earned bonus games and are awarded to a user, and the game controller will execute bonus game instances (operation 422) in accordance with the amount of earned bonus games. In the non-limiting example of FIG. 5B, the last selected outcome identifier 594C (number 72) was not one of the base game pieces (e.g., it was not one of the primary game pieces or special game pieces of the base game).

As shown in FIG. 5B, the game piece that corresponds to the last selected outcome identifier (e.g., number 72 in FIG. 5B) may include one or more visual indications differentiating that game piece from other game pieces. For example, in FIG. 5B, the game piece for number 72, which was the last outcome identifier 594C that was selected, has a graphic of a clover 580. The clover indicates which game piece was the last one selected. As described herein with respect to FIGS. 7A and 7B, if supplemental outcome identifiers are awarded for a game, the visual indication may be provided for the last supplemental outcome identifier selected (e.g., instead of providing the visual indication for the last of the initial outcome identifiers 594). While the instant figures use a clover graphic for the visual indication of the last selected outcome identifier, other graphics are also contemplated.

Figure 5C:
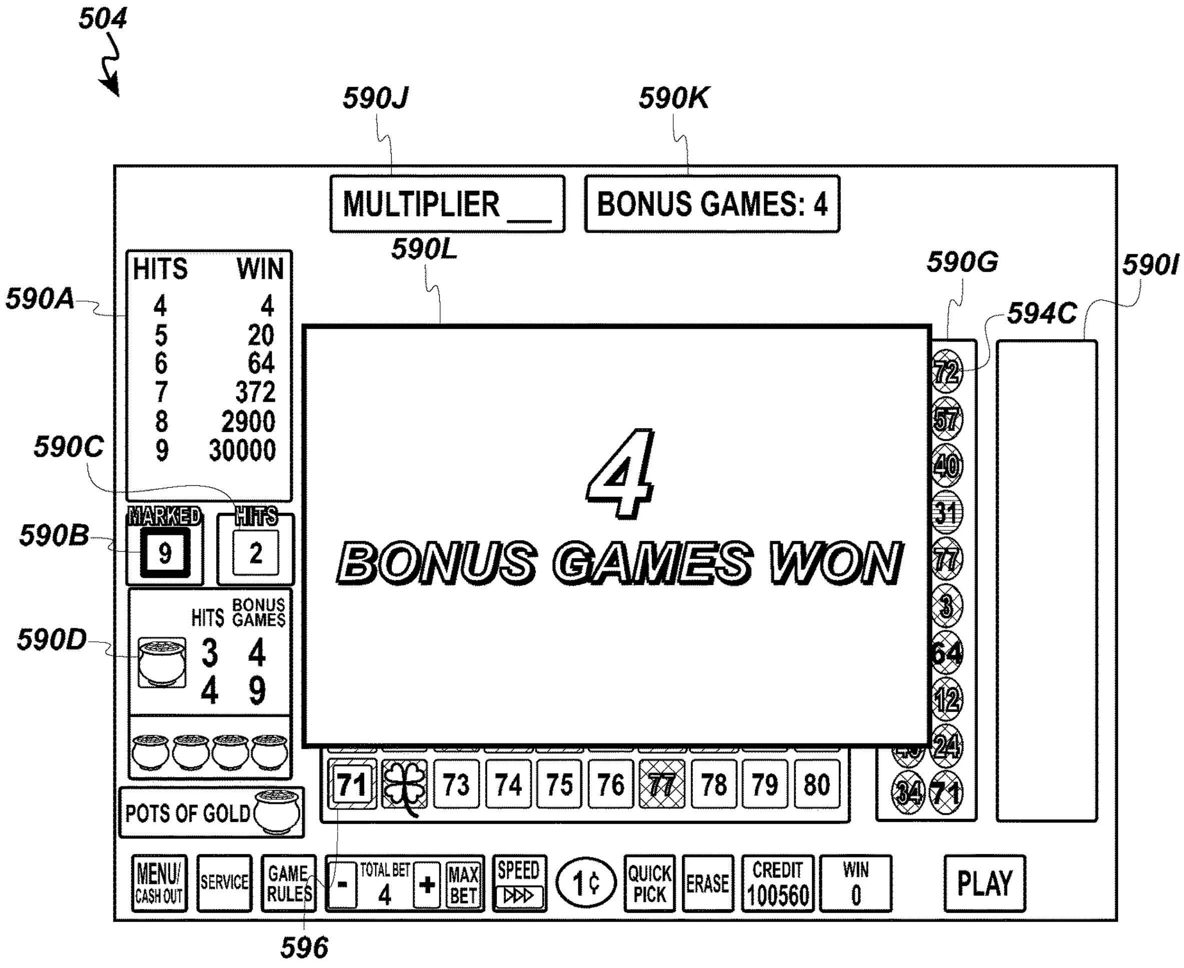

FIG. 5C illustrates the game play UI 504 when the preliminarily earned bonus games become earned after it is determined that the last selected outcome was not a hit at operation 418. As shown in FIG. 5C, a UI region 590L may be displayed with a graphic that informs the user of the number of bonus games that have been earned. This region may cover other parts of the UI (as shown in FIG. 5C) or it may be positioned such that it obscures no other portion of the UI. As the last outcome was not a hit, there is no bonus game multiplier awarded. Additionally, a UI region 590K may be displayed, showing the user how many bonus games the user has earned and/or are remaining. Once the bonus games are earned, the game controller may execute bonus game instances (operation 422) in accordance with the amount of earned bonus games.

The game play UI 504 may also display in a UI region 590J a multiplier value that is to be applied to the preliminarily earned bonus games (or credit win). Since no multiplier was earned in this instance, the UI region 590J shows no multiplier value.

Figure 5D:
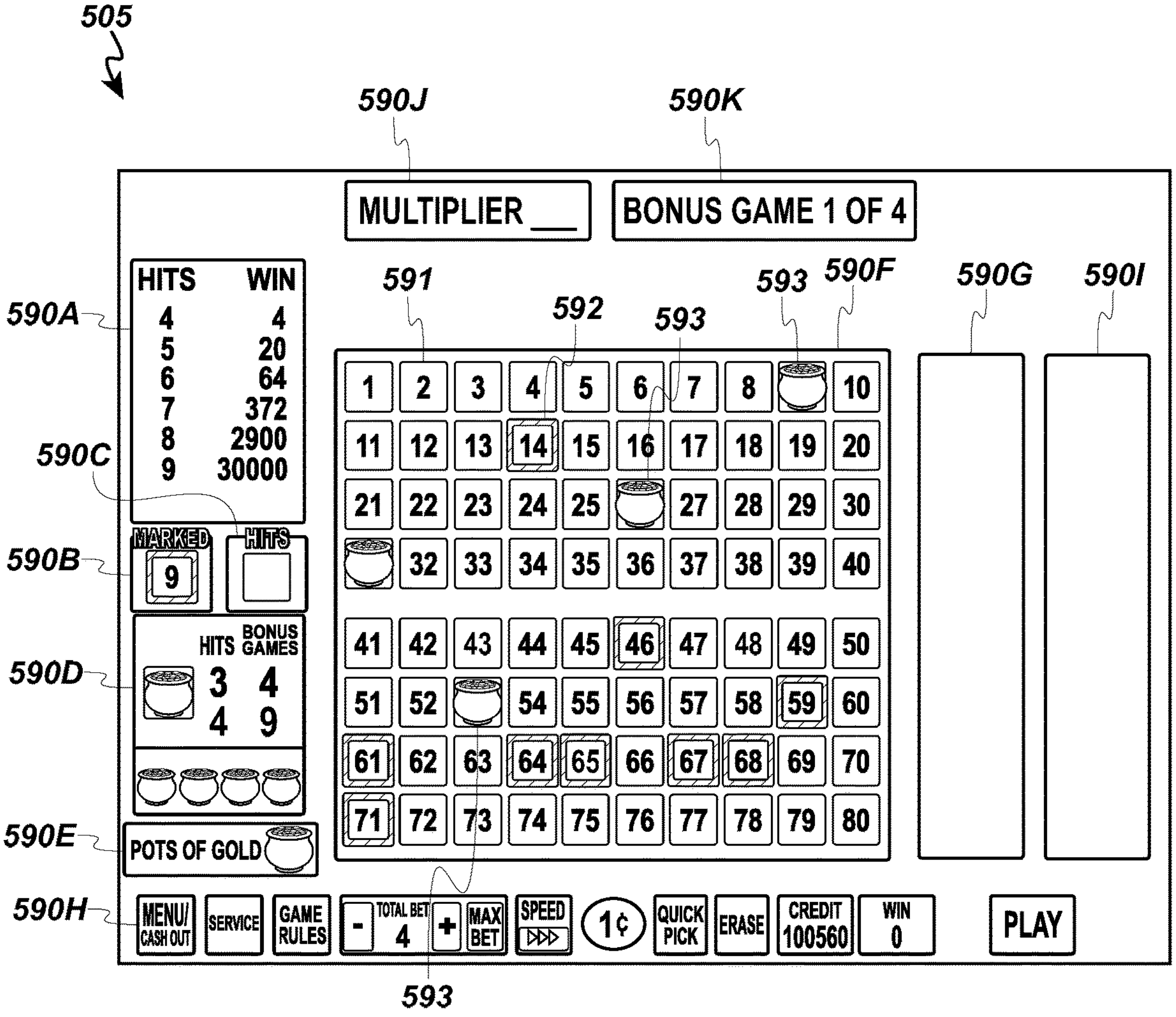

FIG. 5D illustrates a nonlimiting example of a bonus game play UI 505. The bonus game play UI 505 may include substantially the same user interface elements as the base game play UI 504, and the gameplay operation may be substantially the same as described with respect to the base game. As shown in the nonlimiting example of FIG. 5D, the bonus game play UI 505 shows in the UI region 590K the number of bonus games earned and how many have been completed. When the bonus games are executed or instantiated, the same game pieces that were selected for the previous base game may remain selected in the array of game pieces. The user may be permitted to change the selected game pieces (e.g., both the primary game pieces and the special game pieces) before starting the bonus game (e.g., before pressing the "play" button or otherwise initiating the game play sequence). In some cases, the user may not select any more game pieces than were selected during the previous base game. For example, if the user had selected nine primary game pieces and four special game pieces in the base game in which the user earned the bonus games, the user may only select nine primary game pieces and four special game pieces in the bonus game. Additionally, the bonus game may retain the same wager amount as the base game (e.g., during the bonus games, the user cannot change the wager amount from the value of the prior base game). As shown in FIG. 5D, the same wager amount and game pieces that were selected in the base game (FIG. 5A) are pre-populated for the bonus game. The user may then change the particular game pieces that are selected, and thereafter initiate the bonus game.

While the wager amount may remain fixed for the bonus games, the bonus games do not subtract or otherwise require any credits in order to play the games. Stated another way, during the bonus games, the user can win credits, with the win amount based on the wager amount, but the user does not spend any credits to initiate or play the bonus games. Accordingly, bonus games may be considered and referred to as free games.

Returning to operation 418, if the last selected number of the set of selected numbers matches one of the selected game pieces (e.g., either one of the primary game pieces or one of the special game pieces) (418, "YES"), then at operation 420 the amount of preliminarily earned bonus games is multiplied by a multiplier value. The multiplier value may be determined using an RNG (e.g., gaming RNG 318), as described above with respect to FIG. 3. In some cases, the multiplier value is selected from a set of predetermined multiplier values. For example, the game controller may use an RNG (e.g., gaming RNG 318) to select a multiplier value from a weighted table of multiplier values. In some cases, the multiplier values may be three, seven, and twelve, though other values are also contemplated. In some cases, the multiplier value may be selected in another way, such as a random selection of a number between one and ten (e.g., using an RNG without a weighted table).

Figure 6A:
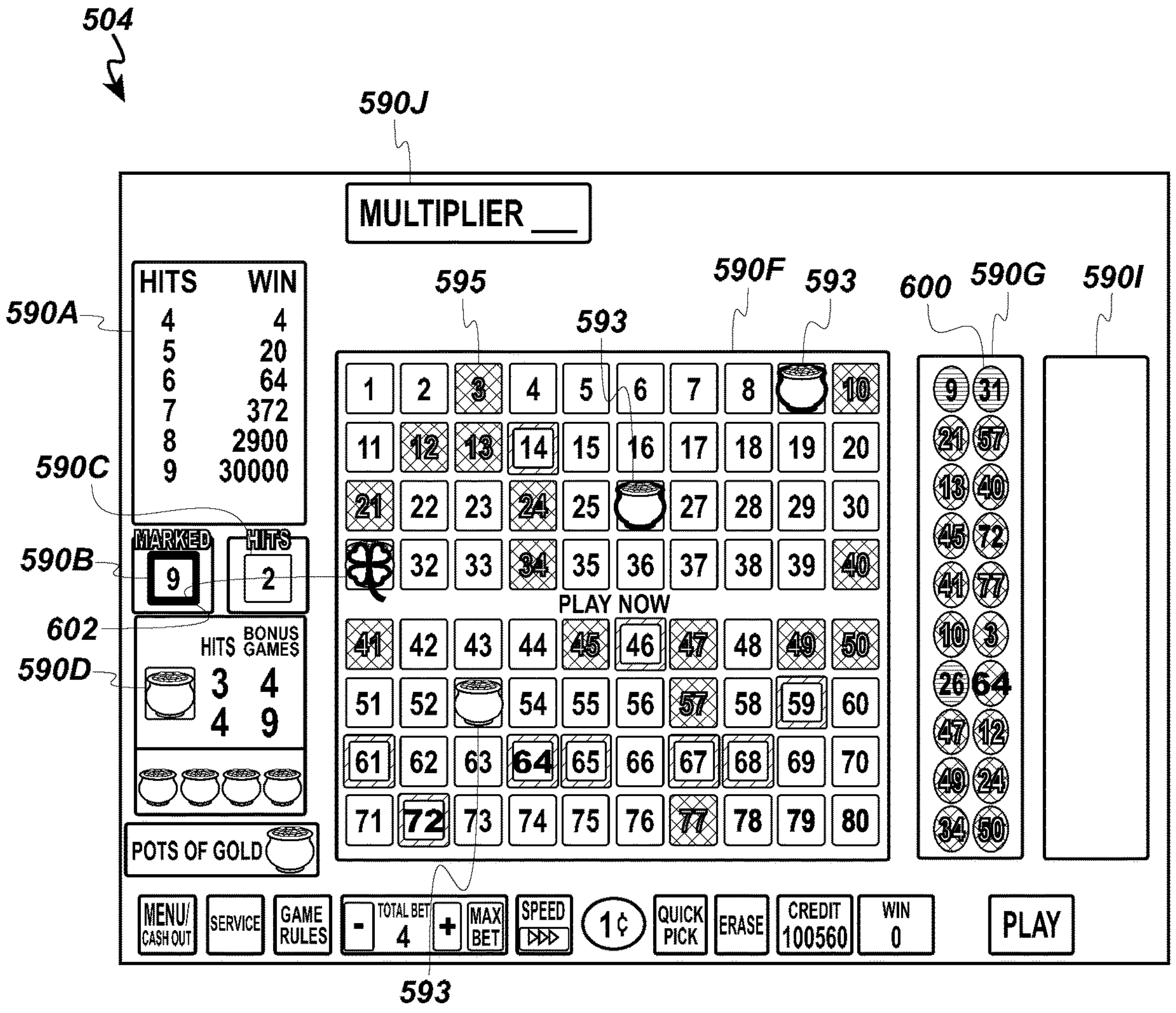
Figure 6B:
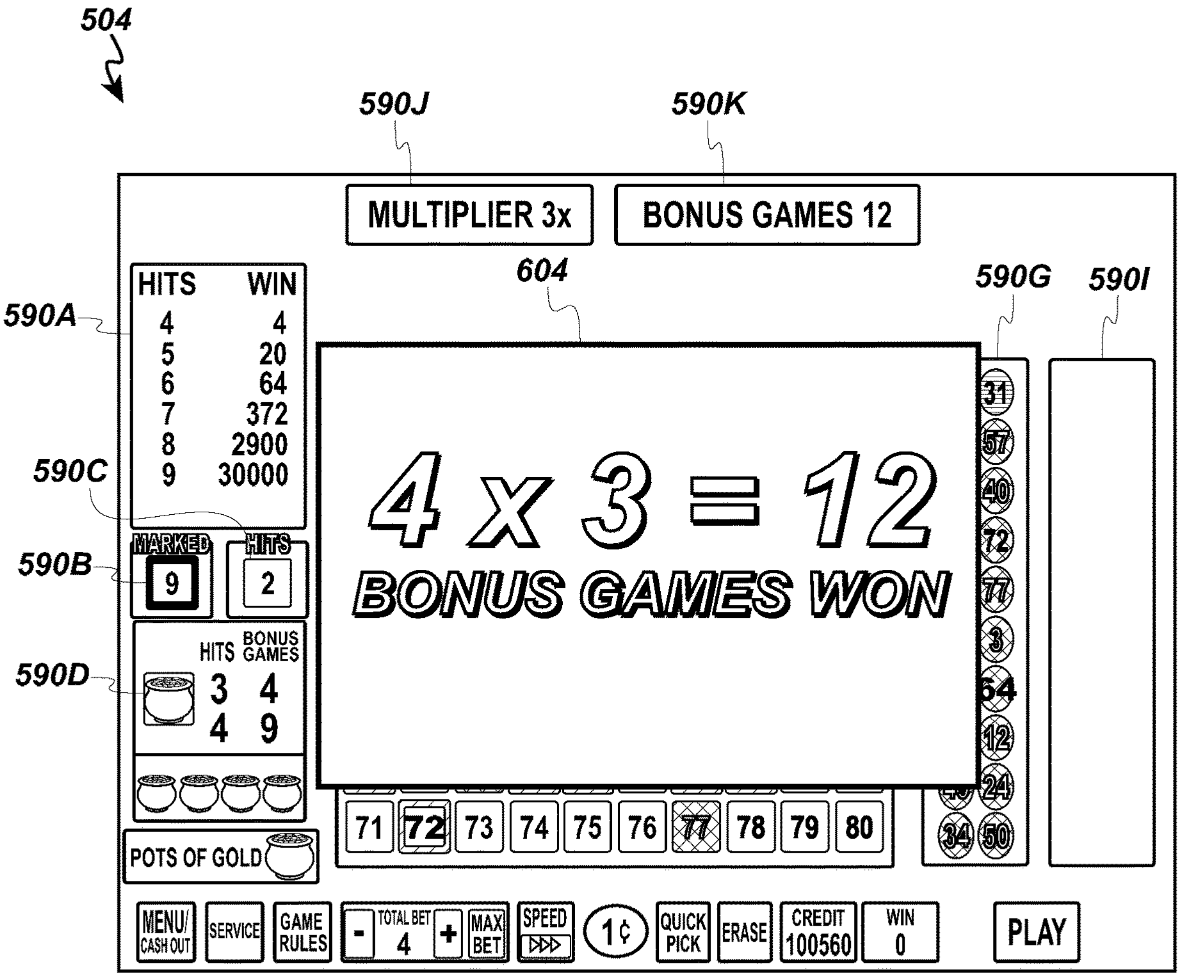

FIGS. 5B-5C illustrate the game play UI 504 when the user has not earned a multiplier (e.g., when the last outcome identifier is not a hit). FIGS. 6A-6B illustrate the game play UI 504 when the last outcome identifier is a hit. For example, FIG. 6A illustrates a different set of outcome identifiers in the UI region 590G as compared to FIG. 5B. In this nonlimiting example, the last outcome identifier 600 corresponds to the number 31, which matches a selected game piece 602. As noted above, the last outcome identifier that is selected is indicated on the array of game pieces using a unique graphic. Accordingly, FIG. 6A illustrates the game piece 602, corresponding to number 31, indicated by a clover.

Once the outcome identifiers are selected, the game controller performs the operations described above, including determining an amount of matches between the outcome identifiers (e.g., the set of selected numbers) and a first subset of the set of selected game pieces (e.g., the primary game pieces) to determine a win amount for the base game (operations 408 and 410), and determining whether bonus games are preliminarily earned (operations 412 and 414).

Because the last outcome identifier is a hit in FIG. 6A, the game controller also performs operation 420 and multiplies the amount of preliminarily earned bonus games by a multiplier value. FIG. 6B illustrates the game play UI 504 after the multiplier value has been determined. For example, FIG. 6B shows the selected multiplier value in the UI region 590J, and a UI region 604 indicates how many bonus games have been earned (e.g., the preliminarily earned bonus games as increased by the multiplier value). The UI region 590K also indicates the amount of earned bonus games. After the game play UI 504 shown in FIG. 6B is displayed, the game controller may execute or instantiate a series of bonus games in accordance with the amount of bonus games earned.

As described above, a player may earn bonus games with or without a multiplier. With reference to FIG. 4, for example, if the last selected number of the set of selected numbers does not match one of the selected game pieces (418, "NO"), at operation 422 the game controller executes the un-multiplied amount of bonus game instances (e.g., the preliminarily earned bonus games). If the last selected number of the set of selected numbers is a hit (418, "YES"), at operation 422 the game controller executes the multiplied amount of bonus game instances. Bonus game instances may be substantially identical to the main game instances. For example, operations 402-422 may be repeated for each bonus game instance. In some cases, bonus games may differ in that the user cannot select more game pieces for the bonus games than were selected during the main game instance that triggered the bonus games. Additionally, the conditions that cause a player to win payouts and bonus games in a bonus game instance may be identical to those in a main game instance. In some cases, however, different win conditions may be applied in a bonus game instance as compared to main game instances (e.g., as compared to main game instances, bonus game instances may use different payout tables, or may have different multiplier values, or may require more or fewer hits on special game pieces to award bonus games, or the like).

FIGS. 5A-6B illustrate example game play in which a set of main outcome identifiers (e.g., numbers) are selected from a pool of outcome identifiers (e.g., numbers), as shown in UI region 590G. For example, 20 numbers are selected from a pool of 80 numbers (e.g., 1-80). In some cases, a set of supplemental outcome identifiers are also selected from the pool of outcome identifiers and displayed in the UI region 590I. The supplemental outcome identifiers may operate the same as the main outcome identifiers with respect to determining win amounts and/or bonus games. That is, a match between a supplemental outcome identifier and a selected game piece may have the same effect as a match between a main outcome identifier and a selected game piece.

Whether or not supplemental outcome identifiers are selected, and the particular number of supplemental outcome identifiers that are selected, may be determined using an RNG (e.g., gaming RNG 318) and a weighted table of values. For example, a weighted table may include a set of predetermined numbers corresponding to the number of supplemental outcome identifiers that can be awarded to a user. The game controller may use an RNG (e.g., gaming RNG 318) to select a value from the weighted table. If the RNG selects a table entry of zero (or a null entry), then no supplemental outcome identifiers are selected. If the RNG selects a table entry with a nonzero value (e.g., five, or any other value in the weighted table), then five supplemental outcome identifiers are selected.

Figure 7A:
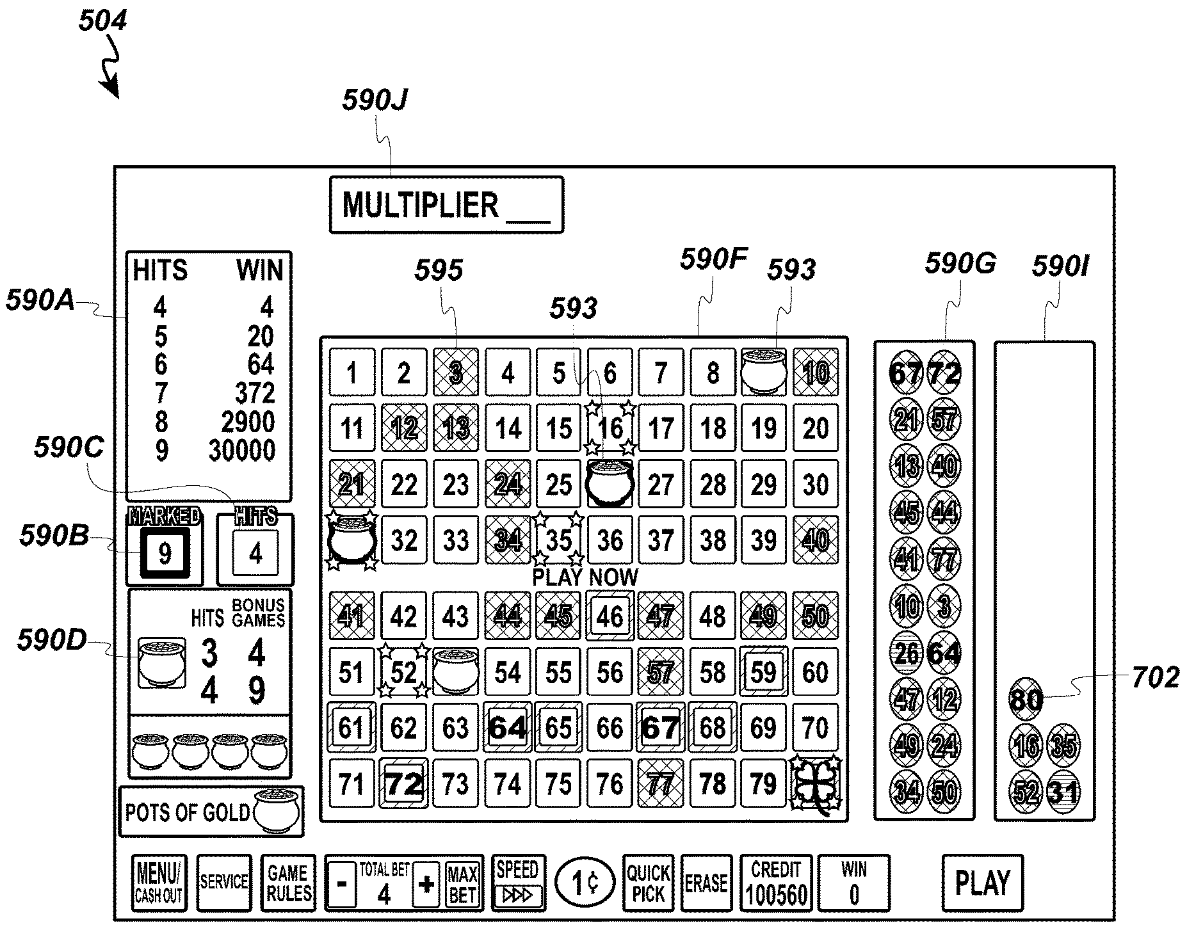

FIG. 7A illustrates a nonlimiting example of the game play UI 504 when the game controller determines that supplemental outcome identifiers are to be selected. For example, the UI region 590G depicts the set of main outcome identifiers that were selected, while the UI region 590I depicts the set of supplemental outcome identifiers that were selected. In this case, five supplemental outcome identifiers were selected, though other amounts may be selected based on the outcome of the RNG as described above.

The game pieces that correspond to the selected supplemental outcome identifiers may be visually differentiated from the game pieces that correspond to the main outcome identifiers. For example, FIG. 7A shows the game pieces that correspond to selected supplemental outcome identifiers with four stars in the corners of the game piece. Of course, this is merely exemplary, and other visual indicators may be used.

As noted above, the supplemental outcome identifiers may be equivalent to the main outcome identifiers with respect to determining win amounts, bonus games earned, and other game play functions. Thus, for example, in the case where supplemental outcome identifiers are to be selected, the last supplemental outcome identifier may be used to determine whether or not a multiplier is awarded. FIG. 7A illustrates the game play UI 504 when the last selected supplemental outcome identifier 702 is a hit (e.g., it matches a selected primary game piece). In particular, the last selected supplemental outcome identifier 702 corresponds to the number 80. Accordingly, the game piece having the number 80 is shown with the clover. Because the number 80 was one of the selected primary game pieces, the user has earned a multiplier as described above.

In some cases, earning a "hit" on the last selected outcome identifier results in a multiplier being added to a credit win. For example, returning to FIG. 4, the game controller may, at operation 408, determine an amount of matches between selected numbers and a first subset of selected game pieces (e.g., the primary game pieces). If the amount of matches satisfies a condition for earning an award, based on the pay table for the game, the game controller may apply a multiplier if the last selected number matches one of the selected primary game pieces. The multiplier may be determined using the same RNG and weighted table as the multiplier that is applied to bonus games, or it may use a different RNG and weighted table (or other selection mechanic). FIG. 7A illustrates an example game outcome that may result in the application of a multiplier to the credit award. In particular, the game outcome in FIG. 7A includes four hits on primary game pieces, which corresponds to an award of four credits as indicated in the UI Region 590A. Additionally, the last selected outcome identifier (number 80, selected as a supplementary outcome identifier) is a hit on one of the primary game pieces, thereby earning a multiplier value, which may be applied to the credit award. For example, if the multiplier value is seven, the user may be awarded 28 credits.

Figure 7B:
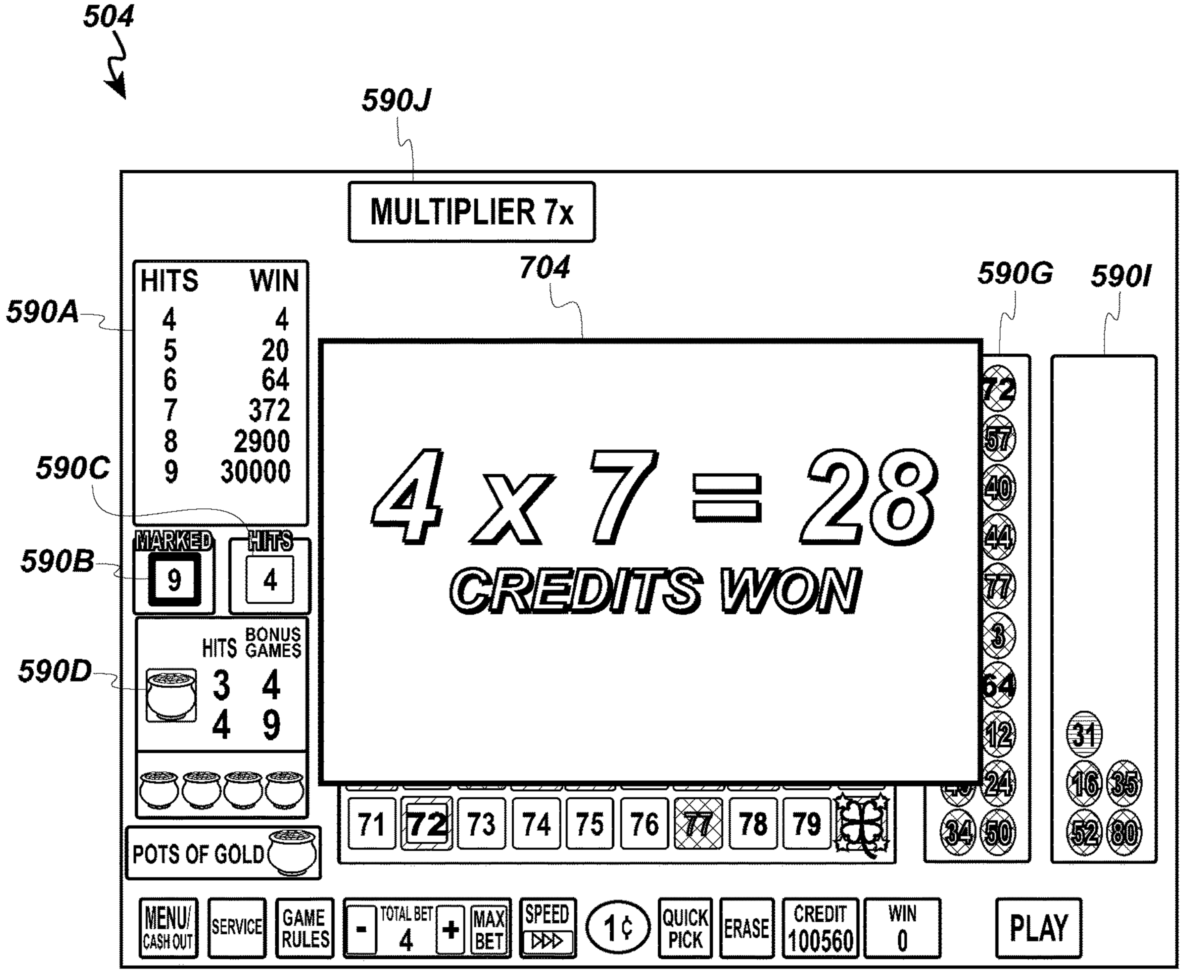

FIG. 7B illustrates the game play UI 504 after the multiplier value has been determined. For example, FIG. 7B shows the selected multiplier value in the UI region 590J, and a UI region 704 indicates now many credits have been earned (e.g., the credit award from the pay table in the UI region 590A as increased by the multiplier value). While FIG. 6B illustrates a multiplier of three, FIG. 7B illustrates an example in which a different multiplier value (seven) has been selected by the game controller. The game outcome shown in FIG. 7A does not include any earned bonus games, as there were an insufficient number of hits on the special game pieces. However, if bonus games had been earned, after the game play UI 504 shown in FIG. 7B is displayed, the game controller may execute or instantiate a series of bonus games in accordance with the amount of bonus games earned.

Multipliers may be applied to credit awards or bonus game awards according to the type of game piece that matches the last outcome identifier. For example, a multiplier may be applied to a credit award if the last outcome identifier is a hit on a primary game piece, and it may be applied to a bonus game award if the last outcome identifier is a hit on a special game piece. Thus, in cases where both a credit award is earned (e.g., there are sufficient hits on the primary game pieces) and bonus games are earned (e.g., there are sufficient hits on the special game pieces), a multiplier will be applied to the credit award (if the last hit is on a primary game piece) or the bonus games (if the last hit is on a special game piece). Thus, if the game outcome in FIG. 7A had included three or more hits on the special game pieces (thus earning the player bonus games), the multiplier would still have been applied to the credit award, as the last selected outcome identifier 702 was a hit on one of the primary game pieces (number 80), and not one of the special game pieces. Similarly, in the example game outcome shown in FIG. 6A, if there had been four or more hits on the primary game pieces (thus earning the player a credit award), the multiplier would still have been applied to the bonus games, as the last selected outcome identifier 600 was a hit on one of the special game pieces (number 31).

As noted above, the RNGs (e.g., gaming RNG 318) and weighted tables that are used to determine the values and frequencies of various bonus features described herein affect the RTP and volatility of the overall keno game. Accordingly, the pay table that specifies the win amounts for particular amounts of matches (or hits) may be different from that of a standard keno game. Further, because the pay table and the win amounts and frequencies of the bonus features both contribute to the RTP and volatility of the game, the particular values of the pay table and the RTP of the bonus features may be selected in conjunction with one another to achieve particular gameplay targets (e.g., a target RTP value).

FIG. 8A depicts an example pay table 800 of a conventional keno game. The pay table 800 indicates the payout (e.g., credit value) for each number of hits earned during a game. Thus, for example, if the user marks 6 spots and achieves 5 hits, the payout would be 68 credits. For each column (representing the number of spots marked for a game instance), an RTP is provided. Given a random distribution of numbers being selected for the game outcomes, the RTP for each column may be based solely on the values in that column.

FIG. 8B depicts an example pay table 802 for use in a game that includes bonus features, such as the bonus games, bonus game multipliers, special game pieces, extra outcome identifiers, and credit award multipliers described herein. Notably, the RTP of the game for each column may not be defined based solely on the credit values in the pay table. Rather, the RTP of the bonus features that may be earned for each amount of spots marked (e.g., each column) may also contribute to the RTP. Thus, the pay table has a first contribution to the target RTP of the game, while the bonus features have a second contribution to the target RTP of the game. As one nonlimiting example, the RTP of the pay table alone for a game instance with six marked spots may be around 64%. However, the bonus features of the game which are not represented in this pay table (e.g., the possibility of winning bonus games, bonus game multipliers, credit award multipliers, etc.) also contribute to the RTP of the game. Thus, the RTP for a six-spot game may be higher, such as the 92% indicated.

The addition of the bonus features also allows increased control over the volatility of the video keno game. For example, if a higher volatility is desired, the mechanics of the bonus features (e.g., the likelihood of earning bonus games and/or a bonus game multiplier) may be adjusted (e.g., to provide higher bonus game multipliers). In order to compensate for this adjustment while also managing the game's RTP, the pay table values and/or the frequency of the bonus game multiplier may be adjusted accordingly. In this way, a high degree of control of the RTP and volatility of the game may be exercised, which may help ensure that the game meets applicable regulations and player expectations.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

at least one display device comprising at least one touchscreen and a plurality of user interface (UI) display areas;

at least one memory with instructions stored thereon; and at least one processor in communication with the at least one memory, wherein the instructions, when executed by the at least one processor, cause the at least one processor to:

cause display of a first number of UI elements in a first UI display area of the plurality of UI display areas;

receive user input at the at least one touchscreen, the user input associated with selection of a plurality of selected UI elements from the first number of UI elements displayed in the first UI display area;

update display of a first subset of the plurality of selected UI elements as having a first visual indicator overlaid thereon, the first visual indicator comprising a first pattern, color, or shade and indicating that the first subset of the plurality of selected UI elements have been selected;

update display of a second subset of the plurality of selected UI elements as having a second visual indicator overlaid thereon, the second visual indicator comprising a second pattern, color, or shade and communicating that when at least one selected UI element of the second subset of the plurality of selected UI elements matches at least one UI element of a second number of UI elements to be displayed in a second UI display area of the plurality of UI display areas, a multiplier will be applied to a number of bonus games to be provided;

cause display of the second number of UI elements in the second UI display area, wherein the second number of UI elements correspond to a subset of the first number of UI elements; and cause display of a total number of bonus games to be presented in a display region that overlays at least one of the first UI display area or the second UI display area, wherein the total number of bonus games is determined based on a first number of bonus games determined based on a trigger condition being satisfied and the multiplier that is applied to the first number of bonus games to generate the total number of bonus games, the multiplier being determined based on the at least one selected UI element being included in the second number of UI elements that correspond to the subset of the first number of UI elements.

2. The electronic gaming device of claim 1, wherein the instructions further cause the at least one processor to identify the at least one selected UI element based on the user input.

3. The electronic gaming device of claim 1, wherein the instructions further cause the at least one processor to identify the at least one selected UI element based on an output from a random number generator (RNG).

4. The electronic gaming device of claim 1, wherein the instructions further cause the at least one processor to:

cause the first number of bonus games, the multiplier, and the total number of bonus games to be displayed as overlaid upon at least one of the first UI display area or the second UI display area to communicate to a player how the total number of bonus games was determined.

5. The electronic gaming device of claim 1, wherein the multiplier is further determined based on a lookup in a table stored in the at least one memory that is configured to maintain a target return to player (RTP) across the game and the total number of bonus games.

6. The electronic gaming device of claim 1, wherein the multiplier is determined based on the at least one selected UI element being a last selected UI element.

7. An electronic gaming system comprising:

at least one display device comprising at least one touchscreen and a plurality of user interface (UI) display areas;

at least one memory with instructions stored thereon; and at least one processor in communication with the at least one memory, wherein the instructions, when executed by the at least one processor, cause the at least one processor to:

cause display of a first number of UI elements in a first UI display area of the plurality of UI display areas;

receive user input at the at least one touchscreen, the user input associated with selection of a plurality of selected UI elements from the first number of UI elements displayed in the first UI display area;

update display of a first subset of the plurality of selected UI elements as having a first visual indicator overlaid thereon, the first visual indicator comprising a first pattern, color, or shade and indicating that the first subset of the plurality of selected UI elements have been selected;

update display of a second subset of the plurality of selected UI elements as having a second visual indicator overlaid thereon, the second visual indicator comprising a second pattern, color, or shade and communicating that when at least one selected UI element of the second subset of the plurality of selected UI elements matches at least one UI element of a second number of UI elements to be displayed in a second UI display area of the plurality of UI display areas, a multiplier will be applied to a number of bonus games to be provided;

cause display of the second number of UI elements in the second UI display area, wherein the second number of UI elements correspond to a subset of the first number of UI elements; and cause display of a total number of bonus games to be presented in a display region that overlays at least one of the first UI display area or the second UI display area, wherein the total number of bonus games is determined based on a first number of bonus games determined based on a trigger condition being satisfied and the multiplier that is applied to the first number of bonus games to generate the total number of bonus games, the multiplier being determined based on the at least one selected UI element being included in the second number of UI elements that correspond to the subset of the first number of UI elements.

8. The electronic gaming system of claim 7, wherein the instructions further cause the at least one processor to identify the at least one selected UI element based on the user input.

9. The electronic gaming system of claim 7, wherein the instructions further cause the at least one processor to identify the at least one selected UI element based on an output from a random number generator (RNG).

10. The electronic gaming system of claim 7, wherein the instructions further cause the at least one processor to:

cause the first number of bonus games, the multiplier, and the total number of bonus games to be displayed as overlaid upon at least one of the first UI display area or the second UI display area to communicate to a player how the total number of bonus games was determined.

11. The electronic gaming system of claim 7, wherein the multiplier is further determined based on a lookup in a table stored in the at least one memory that is configured to maintain a target return to player (RTP) across the game and the total number of bonus games.

12. The electronic gaming system of claim 7, wherein the multiplier is determined based on the at least one selected UI element being a last selected UI element.

13. At least one non-transitory computer-readable storage medium with instructions stored thereon that, in response to execution by at least one processor, cause the at least one processor to:

cause display of a first number of UI elements in a first UI display area of a plurality of UI display areas displayed on at least one display device comprising a touchscreen;

receive user input at the touchscreen, the user input associated with selection of a plurality of selected UI elements from the first number of UI elements displayed in the first UI display area;

update display of a first subset of the plurality of selected UI elements as having a first visual indicator overlaid thereon, the first visual indicator comprising a first pattern, color, or shade and indicating that the first subset of the plurality of selected UI elements have been selected;

update display of a second subset of the plurality of selected UI elements as having a second visual indicator overlaid thereon, the second visual indicator comprising a second pattern, color, or shade and communicating that when at least one selected UI element of the second subset of the plurality of selected UI elements matches at least one UI element of a second number of UI elements to be displayed in a second UI display area of the plurality of UI display areas, a multiplier will be applied to a number of bonus games to be provided;

cause display of the second number of UI elements in the second UI display area, wherein the second number of UI elements correspond to a subset of the first number of UI elements; and cause display of a total number of bonus games to be presented in a display region that overlays at least one of the first UI display area or the second UI display area, wherein the total number of bonus games is determined based on a first number of bonus games determined based on a trigger condition being satisfied and the multiplier that is applied to the first number of bonus games to generate the total number of bonus games, the multiplier being determined based on the at least one selected UI element being included in the second number of UI elements that correspond to the subset of the first number of UI elements.

14. The at least one non-transitory computer-readable storage medium of claim 13, wherein the instructions further cause the at least one processor to identify the at least one selected UI element based on the user input.

15. The at least one non-transitory computer-readable storage medium of claim 13, wherein the instructions further cause the at least one processor to identify the at least one selected UI element based on an output from a random number generator (RNG).

16. The at least one non-transitory computer-readable storage medium of claim 13, wherein the instructions further cause the at least one processor to:

cause the first number of bonus games, the multiplier, and the total number of bonus games to be displayed as overlaid upon at least one of the first UI display area or the second UI display area to communicate to a player how the total number of bonus games was determined.

17. The at least one non-transitory computer-readable storage medium of claim 13, wherein the multiplier is further determined based on a lookup in a table stored in the at least one non-transitory computer-readable storage medium that is configured to maintain a target return to player (RTP) across the game and the total number of bonus games.

18. The at least one non-transitory computer-readable storage medium of claim 13, wherein the multiplier is determined based on the at least one selected UI element being a last selected UI element.

* * * * *